United States Patent
Carranza et al.

(10) Patent No.: US 7,658,779 B2
(45) Date of Patent: Feb. 9, 2010

(54) MONOLITHIC ELEMENT WITH REINFORCED CORNERS FOR THE FILTRATION OF PARTICLES

(75) Inventors: Francisco Jose Carranza, Salon de Provence (FR); David E. Woolley, Ayer, MA (US); Andrew K. Leighton, Dudley, MA (US)

(73) Assignee: SAINT-GOBAIN Centre de Recherches et d'Etudes European, Courbevoie (FR)

( * ) Notice: Subject to any disclaimer, the term of this patent is extended or adjusted under 35 U.S.C. 154(b) by 155 days.

(21) Appl. No.: 11/567,330

(22) Filed: Dec. 6, 2006

(65) Prior Publication Data
US 2008/0072573 A1  Mar. 27, 2008

(51) Int. Cl.
*B01D 39/06* (2006.01)
*B01D 24/00* (2006.01)
*B01D 39/14* (2006.01)
*B01D 50/00* (2006.01)
*F01N 3/10* (2006.01)
*B01D 53/34* (2006.01)

(52) U.S. Cl. .............................. 55/523; 55/522; 55/524; 422/172; 422/173; 422/174; 422/175; 422/176; 422/177; 422/178; 422/179; 422/180

(58) Field of Classification Search ........... 55/522–524; 422/170–180
See application file for complete search history.

(56) References Cited

U.S. PATENT DOCUMENTS

| 6,656,564 B2* | 12/2003 | Ichikawa et al. ............ 428/116 |
| 6,803,087 B2* | 10/2004 | Brew et al. .................. 428/116 |
| 2005/0011174 A1* | 1/2005 | Hong et al. ................... 55/523 |
| 2005/0016140 A1* | 1/2005 | Komori et al. ................ 55/523 |
| 2005/0016141 A1* | 1/2005 | Hong et al. ................... 55/523 |
| 2005/0025933 A1* | 2/2005 | Masukawa et al. .......... 428/116 |
| 2005/0095179 A1* | 5/2005 | Kasai et al. ................. 422/177 |
| 2005/0161849 A1* | 7/2005 | Ohno et al. ................... 264/43 |
| 2006/0032203 A1* | 2/2006 | Komori et al. ................ 55/523 |
| 2006/0198984 A1* | 9/2006 | Aoki .......................... 428/116 |

FOREIGN PATENT DOCUMENTS

| EP | 1 484 100 A1 | 12/2004 |
| EP | 1 698 397 A1 | 9/2006 |
| WO | WO2004/111398 | * 12/2004 |

* cited by examiner

*Primary Examiner*—Walter D Griffin
*Assistant Examiner*—Amber Orlando
(74) *Attorney, Agent, or Firm*—Oblon, Spivak, McClelland, Maier & Neustadt, L.L.P.

(57) ABSTRACT

The invention relates to a honeycomb monolithic element for the filtration of particles, characterized in that the peripheral channels forming part of the outer wall of said element are configured to help in the formation of an outer wall whose inner face is substantially flat over the whole length of the element and in that said flat wall also has an increased thickness at the corners, so that, on a cross section, the ratio R of the thickness $E_c$ of the wall, measured along the bisecting line of the angle at a corner of the element, over the minimal thickness $E_{min}$ of said wall is greater than 1.5.

21 Claims, 6 Drawing Sheets

MONOLITHIC ELEMENT WITH REINFORCED CORNERS FOR THE FILTRATION OF PARTICLES

RELATED APPLICATION

This application claims priority to French Patent Application No. FR 0653960, filed Sep. 27, 2006, the disclosure of which is incorporated herein by reference in its entirety.

BACKGROUND

The invention relates to the field of particle filters particularly used in an exhaust line of an engine for the elimination of soot produced by the combustion of a diesel fuel in an internal combustion engine.

The filtration structures for the soot contained in internal combustion engine exhaust gases are well known in the prior art. These structures most frequently have a honeycomb structure, one of the faces of the structure allowing the intake of the exhaust gases to be filtered and the other face the discharge of the filtered exhaust gases. The structure comprises, between the intake and discharge faces, a set of adjacent ducts or channels with axes parallel with one another separated by porous filtration walls, said ducts being stopped at one or other of their ends in order to delimit the inlet chambers opening on the intake face and the outlet chambers opening on the discharge face. For a good seal, the peripheral portion of the structure is most frequently surrounded by a coating cement. The channels or ducts are alternately stopped in an order such that the exhaust gases, as they pass through the honeycomb body, are forced to pass through the side walls of the inlet channels to join the outlet channels. In this manner, the particles or soot are deposited and accumulate on the porous walls of the filtering body. Most frequently, the filtering bodies used in motor vehicle exhaust lines are made of porous ceramic material, for example of cordierite or of silicon carbide.

In a known manner, during its use, the particle filter is subjected to a succession of filtration phases (accumulation of soot) and of regeneration (elimination of soot). During the filtration phases, the soot particles emitted by the engine are retained and deposited inside the filter. During the regeneration phases, the soot particles are burned inside the filter, in order to restore thereto its filtration properties. The porous structure is then subjected to intense thermo-mechanical stresses, which may cause micro-cracks that are likely over time to cause a severe loss of the filtration capabilities of the unit, and even its complete deactivation. This phenomenon is particularly observed on large diameter monolithic filters. Specifically, in the operation of an exhaust line, it has been observed that the temperature gradient between the center and the periphery of such structures increases as the dimensions of the monolith increase.

To solve these problems and increase the service life of the filters, filtration structures have more recently been proposed combining several monolithic honeycomb blocks or elements. The elements are most frequently assembled together by bonding by means of an adhesive or a cement of a ceramic nature, called in the rest of the description a joint cement. Examples of such filtering structures are for example described in patent applications EP 816 065, EP 1 142 619, EP 1 455 923, WO 2004/090294 or else WO 2005/063462. In order to provide a better relaxation of the stresses in an assembled structure, it is known that the heat expansion coefficients of the various portions of the structure (filtration elements, coating cement, joint cement) must be substantially of the same order. Consequently, said portions are advantageously synthesized based on one and the same material, most frequently silicon carbide SiC or cordierite. This choice also makes it possible to even out the heat distribution during the regeneration of the filter.

To increase the filtration surface of said filter, at a constant filter volume, filtering elements whose shape and internal volume of the inlet and outlet channels are different have been proposed, for example in patent application WO 05/016491. In such structures, the wall elements succeed one another, in cross section and along a horizontal and/or vertical row of channels, to define a sinusoidal or wavy shape. The wall elements undulate typically by a half sine wave period over the width of a channel.

To improve the thermomechanical strength of the elements having such a wavy shape of the channels and consequently of the filter assembled from said elements having this particular channel shape, a honeycomb structure has been proposed in WO 05/063462 whose ratio R, characterizing two adjacent peripheral channels, between the average thickness "E" of the set of outer walls and the average thickness "e" of the set of inner walls of said channels, is greater than 1.2. It is indicated in this application that such a configuration makes it possible to reduce the risk of cracks that may appear particularly when local high amplitude stresses are generated during the regeneration phases, particularly due to high temperature gradients existing within the filter and the different types of materials used for the monolithic elements and the joint cement.

Although such an increased thickness of the walls indeed makes it possible to significantly improve the thermomechanical strength of the filters assembled from such elements, it nevertheless also causes a not insignificant weight increase of the filters, typically of the order of 5.5 to 7.5%.

This weight increase has the disadvantage of increasing the thermal inertia of the filter, which causes an excess consumption during the regeneration phases and, when the filter incorporates a catalytic component, impairs its catalytic efficiency due to the increased activation (or energizing) time of the catalyzer.

SUMMARY

The essential object of the present invention is to provide elements for the formation of a filter retaining the good thermomechanical properties of the previously described filters with reinforced wall, but whose total weight is substantially reduced.

More precisely, the invention relates to a monolithic honeycomb element comprising a set of adjacent ducts or channels with axes parallel with one another separated by porous walls, said ducts being stopped by plugs at one or other of their ends to delimit inlet ducts opening on a gas intake face and outlet ducts opening on a gas discharge face, so that the gas passes through the porous walls, wherein the peripheral channels forming part of the outer wall of said element are configured to help in the formation of an outer wall whose inner face is substantially flat over the whole length of the element and wherein said flat wall also has an increased thickness at the corners, so that, on a cross section, the ratio R of the thickness $E_c$ of the wall, measured along the bisecting line of the angle at a corner of the element, over the minimal thickness $E_{min}$ of said wall is greater than 1.5, and preferably greater than 1.6, or even 1.7.

Preferably, the monolithic element has, in cross section, a periodic undulation of the walls of the inner channels making it possible to increase the overall volume of said inlet channels at the expense of the outlet channels.

Usually the thickness $E_{min}$ of said outer wall is measured in the middle of a side of the element.

According to a possible embodiment of the invention, said increased thickness extends, from each corner of the element, over a portion of the outer walls and said increased thickness is continuous and constant over said portion.

According to an alternative embodiment, said increased thickness extends, from each corner of the element, over a portion of the outer walls and said increased thickness is continuous and decreasing over said portion.

Advantageously, according to the invention, said increased thickness extends, from each corner of the element, over a total surface area equal to at least one eighth and preferably equal to at least one quarter of the total surface area of the inner faces of the outer walls.

According to the invention, the ratio of the thickness Ec of the outer wall, measured along the bisecting line of the angle at a corner of the element, over the average thickness e of the inner walls of the channels is for example greater than 2.7, preferably greater than 3.5.

In addition, the thickness $E_c$ of the wall, measured along the bisecting line of the angle at a corner of the element, generally lies between 150 and 5000 microns, preferably between 700 and 2000 microns, preferably still between 1000 and 1300 microns.

Similarly, the thickness $E_{min}$ of said wall at the center of a side of the element advantageously lies between 100 and 3500 microns, preferably between 450 and 1300 microns, preferably still between 600 and 900 microns.

Typically, the average thickness e of the inner walls of the channels lies between 100 and 400 microns, preferably between 200 and 350 microns.

The invention also relates to a filter obtained by the assembly of a plurality of monolithic elements described hereinabove, said elements being connected together by a joint cement.

Advantageously, within the filter, said elements and the joint cement are based on one and the same ceramic material, preferably based on silicon carbide SiC.

Finally, the invention relates to an extrusion die shaped so as to form, by extrusion of a ceramic material, a monolithic element as described hereinabove.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
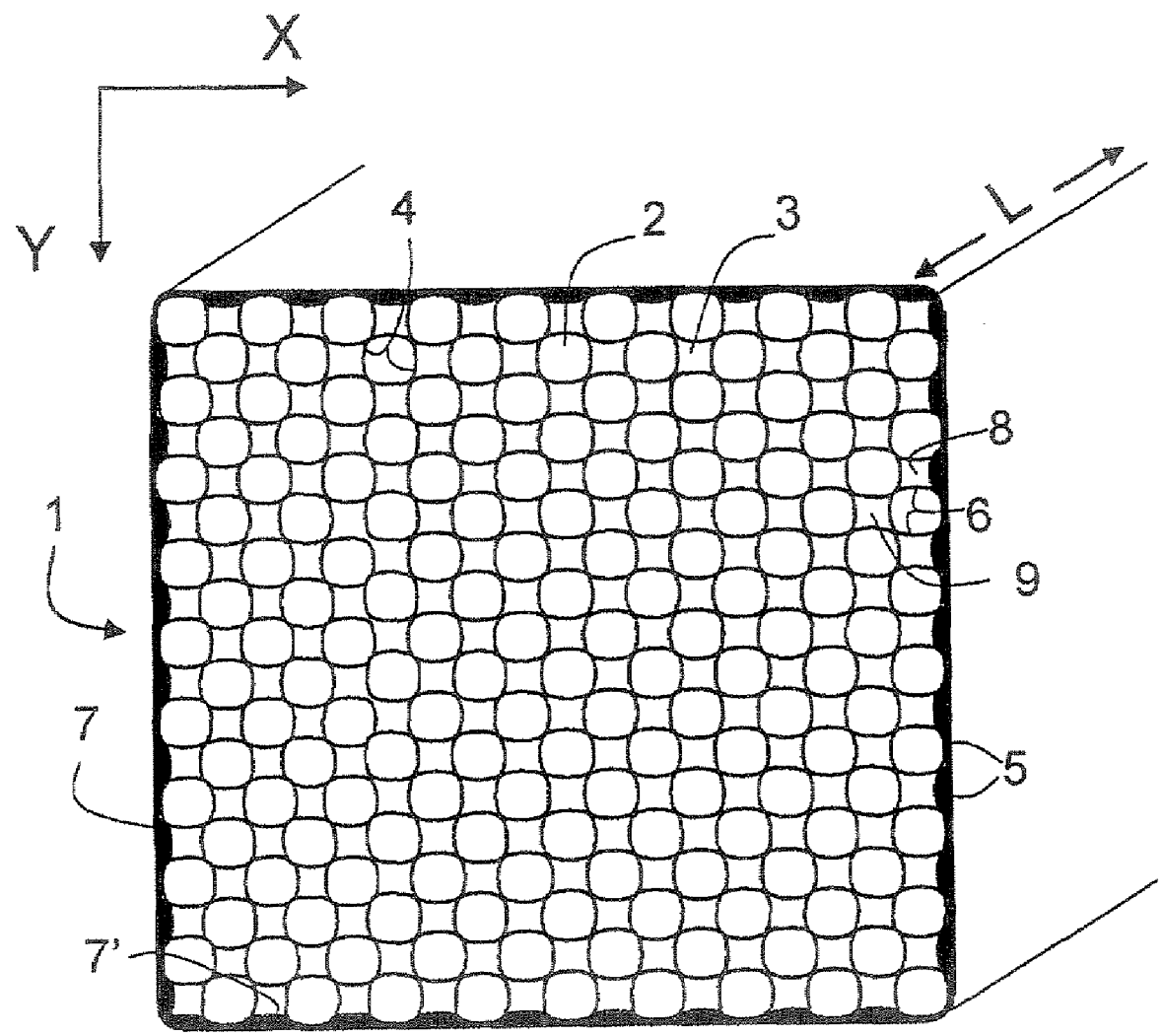
FIG. 1 schematizes a cross section of a monolithic element according to WO 05/063462.

Referring now to the drawings, wherein like reference numerals designate identical or corresponding parts throughout the several views.

According to well known techniques, all the monolithic elements are advantageously obtained by extruding a friable paste, for example made of silicon carbide, to form a porous honeycomb structure.

Without this being considered restrictive, the extruded porous structure has the shape of monolithic blocks 1 whose external shape is that of a rectangular parallelepiped extending along a longitudinal axis between two upstream and downstream faces, as shown in FIG. 1. Its cross section is substantially square. A plurality of adjacent channels 2, 3, whose main axis is parallel with the longitudinal axis of the block, open onto the ends of the elements 1.

In a known manner, but not shown in the figures, the extruded porous structures are alternately stopped on their upstream face or on their downstream face by upstream and downstream plugs, respectively, to form outlet channels 3 and inlet channels 2, respectively. Each channel 2 or 3 thus defines an internal volume delimited by side walls 4, a stopping plug (not shown in the figures) placed either on the upstream face for an outlet channel, or on the downstream face for an inlet channel and an aperture opening alternately toward the downstream face or the upstream face, so that the inlet channels 2 and outlet channels 3 are in fluid communication through the side walls 4.

In a known manner and not shown in the figures, the monolithic elements 1 are then assembled, by bonding by means of a joint cement of a ceramic nature, for example also silicon carbide-based, into a filtration structure or an assembled filter. The assembly thus constituted may then be machined to take, for example, a round or ovoid cross section, then for example covered with a coating cement to give it a seal. The result of this is an assembled filter capable of being inserted into an exhaust line, according to well known techniques. In operation, the stream F of the exhaust gases enters the filter through the inlet channels 2, then passes through the filtering side walls 4 of these channels to join the outlet channels 3.

For more details on the structure of monolithic elements and of their assembly for the formation of a filter, it is possible for example to refer to applications WO 05/063462 or else WO 05/016491.

According to the embodiment described in application WO 05/063462 and illustrated in FIG. 1, the sets of inlet channels 2 and of outlet channels 3 are nested in one another so as to form, in cross section, a checkerboard pattern in which said inlet channels alternate with said outlet channels, in the upward direction (direction y) and in the widthwise direction (direction x).

In the embodiment shown in FIG. 1 and according to the invention, the cross section of the inlet channels 2 is different from that of the outlet channels 3. Thus, the cross sections of the inlet channels 2 are larger than those of the outlet channels 3, in order to increase the overall volume of the inlet channels at the expense of that of the outlet channels. The soot storage capacity per individual element 1 is thus advantageously increased.

The inlet and outlet channels are therefore delimited by nonflat wall elements 4, concave on the side of the inlet channels and convex on the side of the outlet channels.

Preferably, the wall elements succeed one another, in cross section and along a horizontal row (along the x axis) or vertical row (along the y axis) of channels, to define a sinusoidal or wavy shape. The wall elements undulate for example substantially by a half sine wave period over the width of a channel.

The channels located on the periphery of an element 1 are called peripheral channels 8. The channels of which no portion forms part of the outer wall 7 are called inner channels 9.

The walls 4 of the peripheral channels comprise a portion 5 forming part of the outer wall 7 of the element, that is to say in contact with the outside of the element and an inner wall portion 6, shared with adjacent channels 8 or 9.

The walls of the inner channels 9 are characterized by a thickness e which is preferably substantially constant in all the volume of the element. Preferably, the inner wall portion 6 of the peripheral channels 8 also has this thickness e.

The structure according to the prior art is characterized by a globally reinforced outer wall 7 whose inner face 7' is not flat but also has a surface of the wavy type. The outer peripheral wall 7 of the monolithic element is thus reinforced by an average and periodic increased thickness of material placed evenly on its four faces and extending over the whole length L of said element, from its upstream face to its downstream face, as shown in the cross section of FIG. 1.

Figure 2:
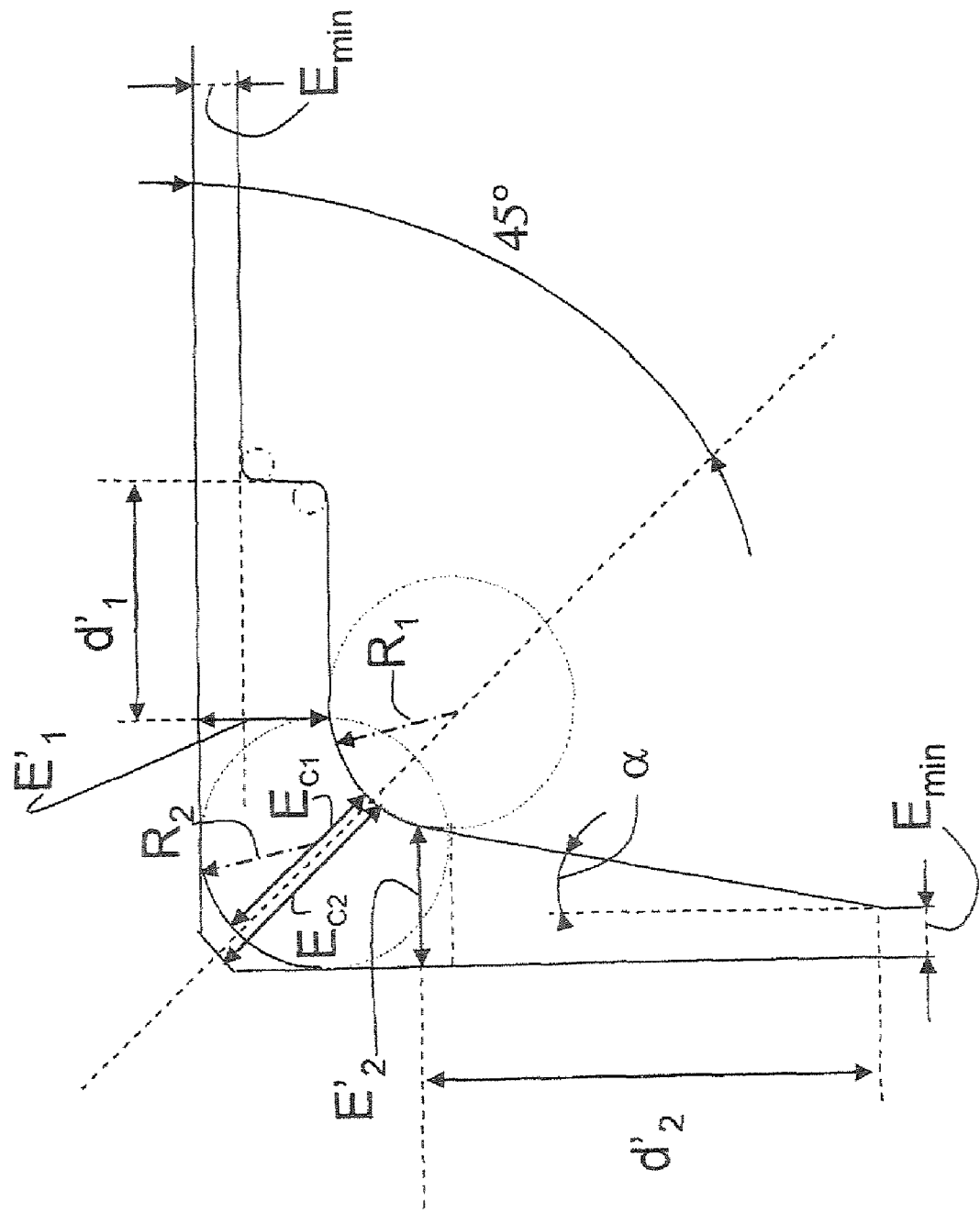
FIG. 2 represents schematically, in cross section, the corner portion of monolithic elements according to the invention.

FIG. 2 represents schematically, in cross section, the reinforced corner part of monolithic elements according to the invention. More precisely, FIG. 2 illustrates different profiles of the increased thicknesses $E_c$ at the corners. According to the invention, the ratio of $E_c$, measured as illustrated in FIG. 2 along the bisecting line of the angle at a corner over the minimal thickness of the outer wall of the element $E_{min}$, is greater than 1.5. Such a feature advantageously leads to a better compromise between the thermomechanical strength and the total weight of the element.

As shown in FIG. 2, said increased thickness $E_c$ in the corner may advantageously be defined:

on one hand, according to a curvature radius $R_1$ of the inner face of the outer wall at a corner of the element, on the other hand, according to the shape of the outer face of the outer wall at said corner.

According to a first example illustrated by FIG. 2, the element has, in the corner, outer surfaces substantially rounded according to a curvature radius $R_2$, defining an increased thickness $E_{C1}$ in the corner. The curvature radius $R_2$ is, according to the invention, preferably less than or equal to $R_1$. Without departing from the context of the invention, $R_2$ could however also be greater than $R_1$.

According to a second example also illustrated by FIG. 2, the corners of the element may also have substantially flat outer surfaces, typically in the form of bevels, which define an increased thickness $E_{C2}$ in the corner.

As shown in FIG. 2, to characterize the elements according to the invention, also defined is a maximal increased thickness E' of the walls "except corner", that is to say independent of the reinforcement effect associated with the difference of the curvature radii in the corner.

This dimension E' may be characterized by:

either a constant value over the whole length $d_1'$ of said increased thickness ($E'_1$ in FIG. 2), or an increasing and regular variation in the direction of the corner over the whole length $d_2'$ of the increased thickness (maximal value $E'_2$ in FIG. 2).

According to the invention, in this latter case, the regular increase of said increased thickness is measured by an angle α lying between 0.5 and 45°, for example lying between 1 and 10°.

Figure 3:
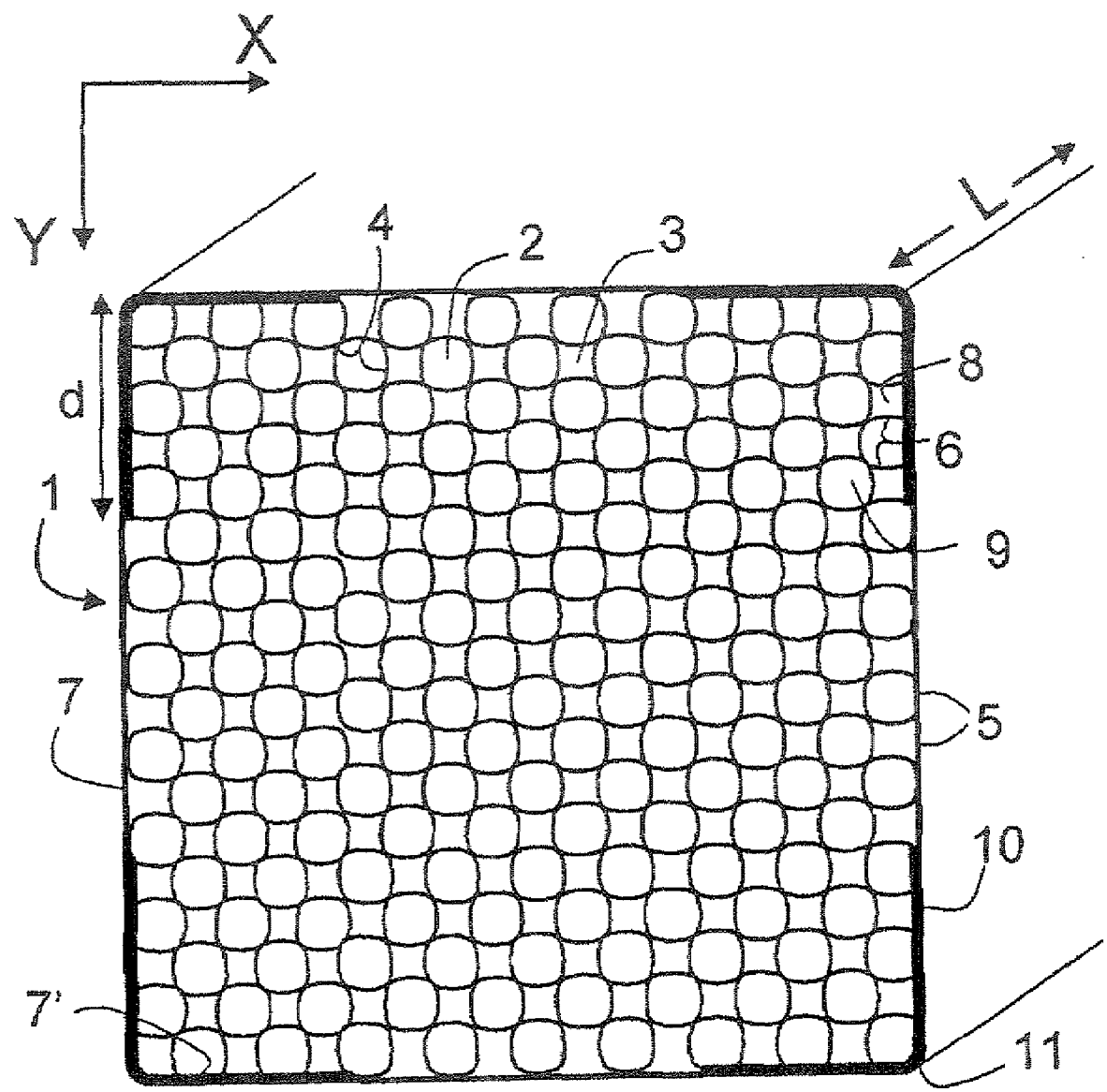
FIG. 3 illustrates a cross section of a monolithic element according to a first embodiment of the invention, in which the outer walls of the element have an inner face that is substantially flat over the whole length of the element, said outer walls also having a continuous and constant increased thickness at the corners.

FIG. 3 illustrates a first embodiment of the invention. In all the figures, the elements and parts of the same type are indicated by the same reference numbers. With reference to FIG. 2, in this embodiment, the angle α is equal to 0 and the curvature radius $R_1$ of the inner face of the wall is equal to the curvature radius $R_2$ of the outer face. Without departing from the context of the invention, it is clearly evident that the rounded corner of the outer face or the inner face could be replaced by a bevel.

The monolithic element conventionally comprises a central part whose inlet channels 2 and outlet channels 3 have a cross section whose shape accords with the teaching of application WO 03/064132. According to this embodiment, the wall elements succeed one another, in cross section and following a horizontal or vertical row of channels, to define a sinusoidal or wavy shape, as already represented in FIG. 1. The wall elements undulate by a half sine wave period over the width of a channel.

Typically, the density of channels of the central and peripheral parts lies between 6 and 1800 cpsi, preferably between 90 and 400 cpsi (cells per square inch, 1 cpsi being equal to 1 cell/6.45 cm²).

According to the embodiment illustrated by FIG. 3, the outer walls 7 of the element have an inner face 7' that is substantially flat over the whole length of the element. Such a configuration of the outer wall 7 is obtained in a known manner, without difficulty, by the use of an appropriate extrusion die. The peripheral channels 8 have, according to this embodiment, an inner wall portion 6, shared with adjacent channels 8 or 9, whose shape and thickness is identical to that of the inner channels 9 and a flat portion 5 forming part of the outer wall 7 of the element. This flat portion 5 has a minimal thickness $E_{min}$, for example measured in the middle of a side of the element, greater than the average thickness e of the inner walls by a factor at least equal to 1.2, preferably greater than 1.4.

According to this embodiment, the outer walls 7 differ not only by the flatness of their inner face 7' but also by the presence of an increased thickness 10 present at the corners 11 of the element. According to the first embodiment of the invention illustrated by FIG. 3, this increased thickness extends over the whole length L of the element and for each side of the element over a distance d from the corners. The increased thickness according to this embodiment is characterized in that it is continuous and constant over its whole length L and its whole width d.

Figure 4:
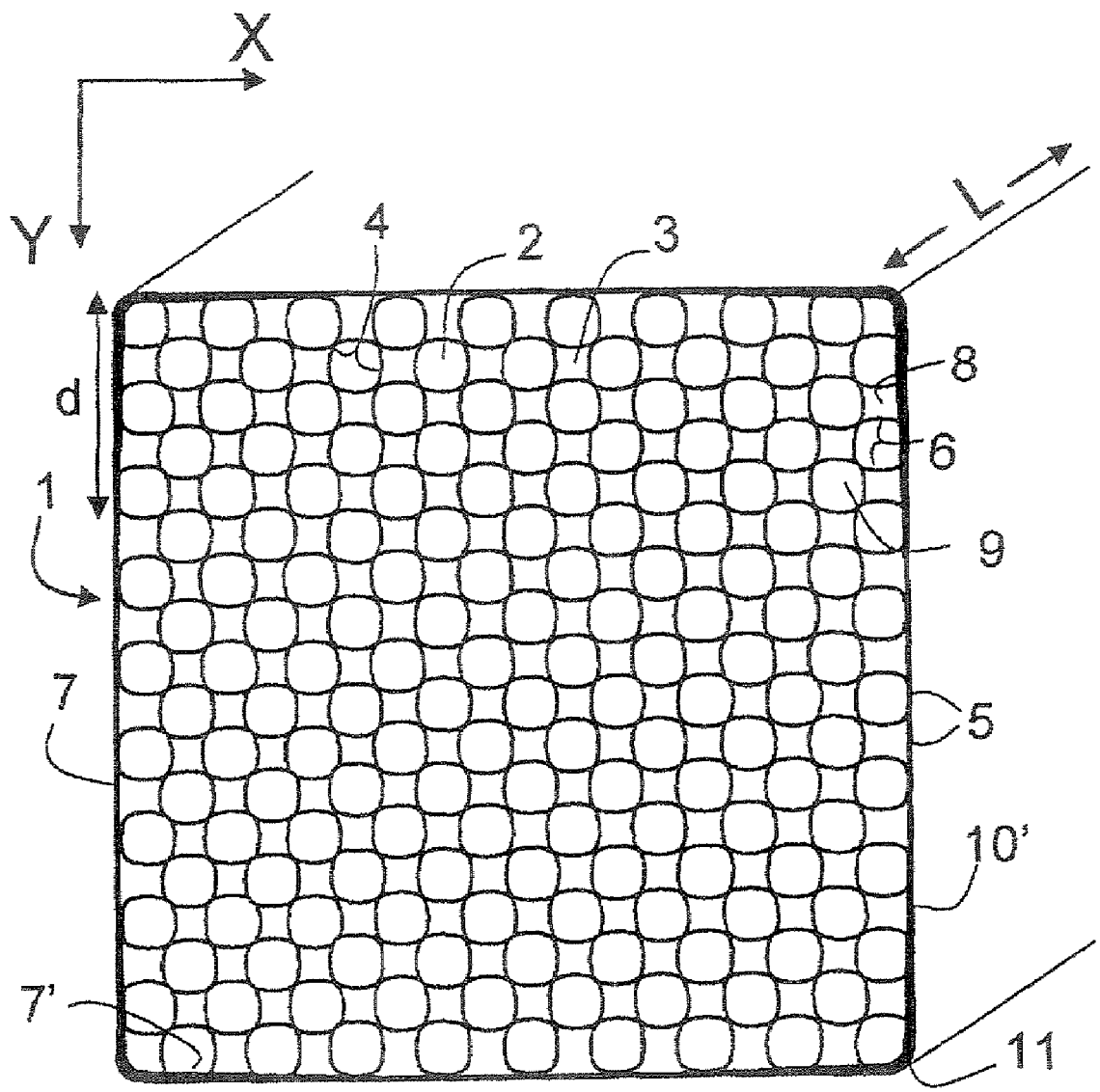
FIG. 4 schematizes a cross section of a monolithic element according to a second embodiment of the invention in which the outer walls of the element have an inner face that is substantially flat over the whole length of the element, said outer walls also having a continuous and decreasing increased thickness from the corners toward the center of the sides of the element.

FIG. 4 illustrates a second embodiment of the invention identical to the preceding embodiment but for which the increased thickness 10' present at the corners 11 is not constant over its length d but decreases in a substantially regular manner along the side of the element, from the corner 11, where the thickness is maximal, and in the direction of the middle of the side, where the thickness of the outer wall is minimal, as illustrated by the cross section of FIG. 4.

Without departing from the context of the invention, it is clearly evident that the rounded corner of the outer face or even the inner face could be replaced by a bevel.

In this second embodiment, the angle α thus formed (see FIG. 2) lies between 0.5 and 45° and the curvature radius $R_1$ of the inner face of the outer wall as defined with reference to FIG. 2 is equal to that of the curvature radius $R_2$ on the outer face.

Figure 5:
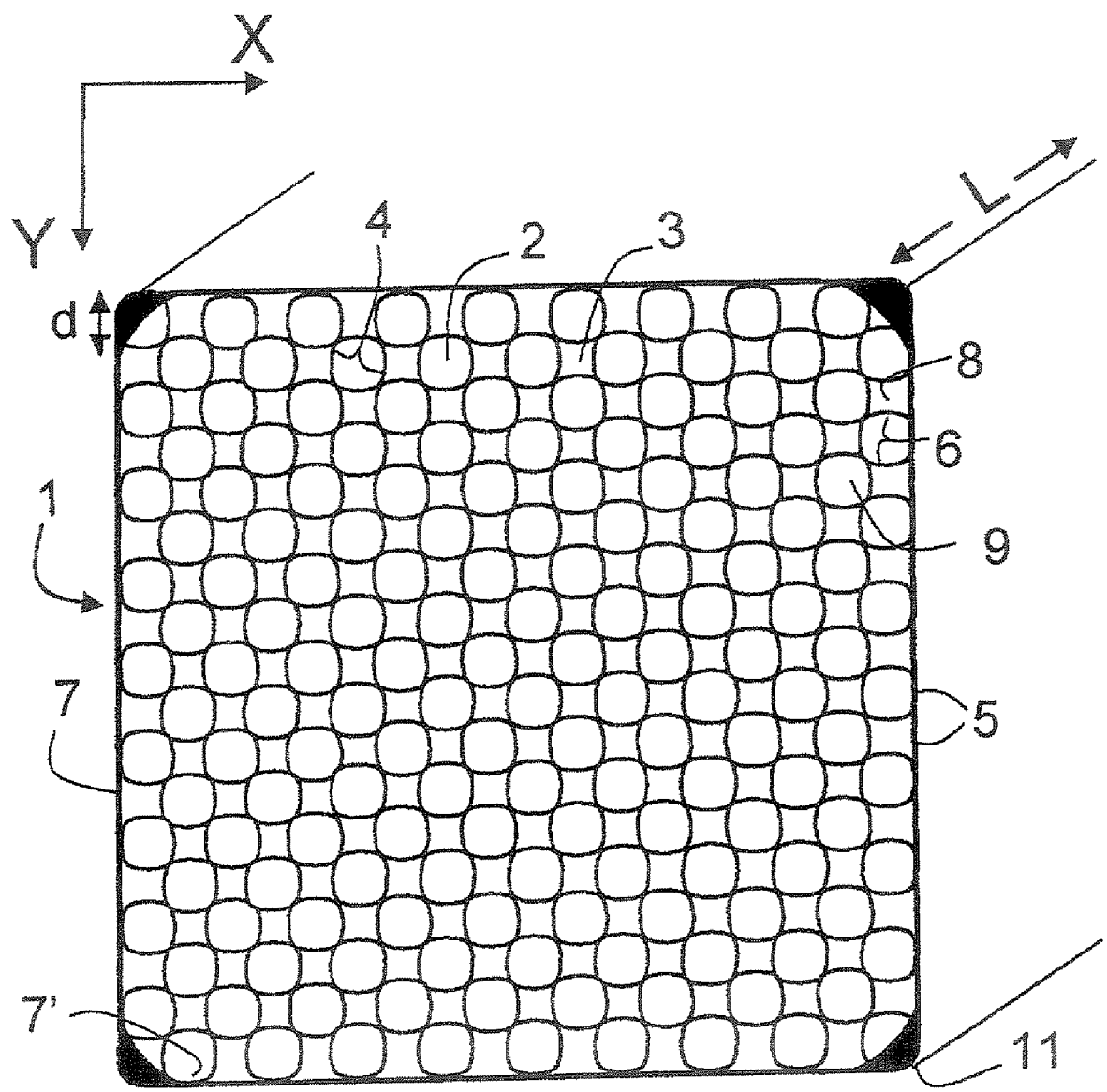
FIG. 5 represents a cross section of a monolithic element according to a third embodiment of the invention in which a continuous and decreasing increased thickness of the corners, in a nonlinear manner, results from a curvature radius $R_1$ of the outer wall at the inner face that is greater than the radius $R_2$ of the outer face.

FIG. 5 illustrates a third embodiment of the invention in which the element is essentially reinforced at its corners. The corners of the element are rounded and the curvature radius $R_2$ of the outer face of the outer wall is less than the curvature radius $R_1$ of the inner face of the outer wall.

Figure 6:
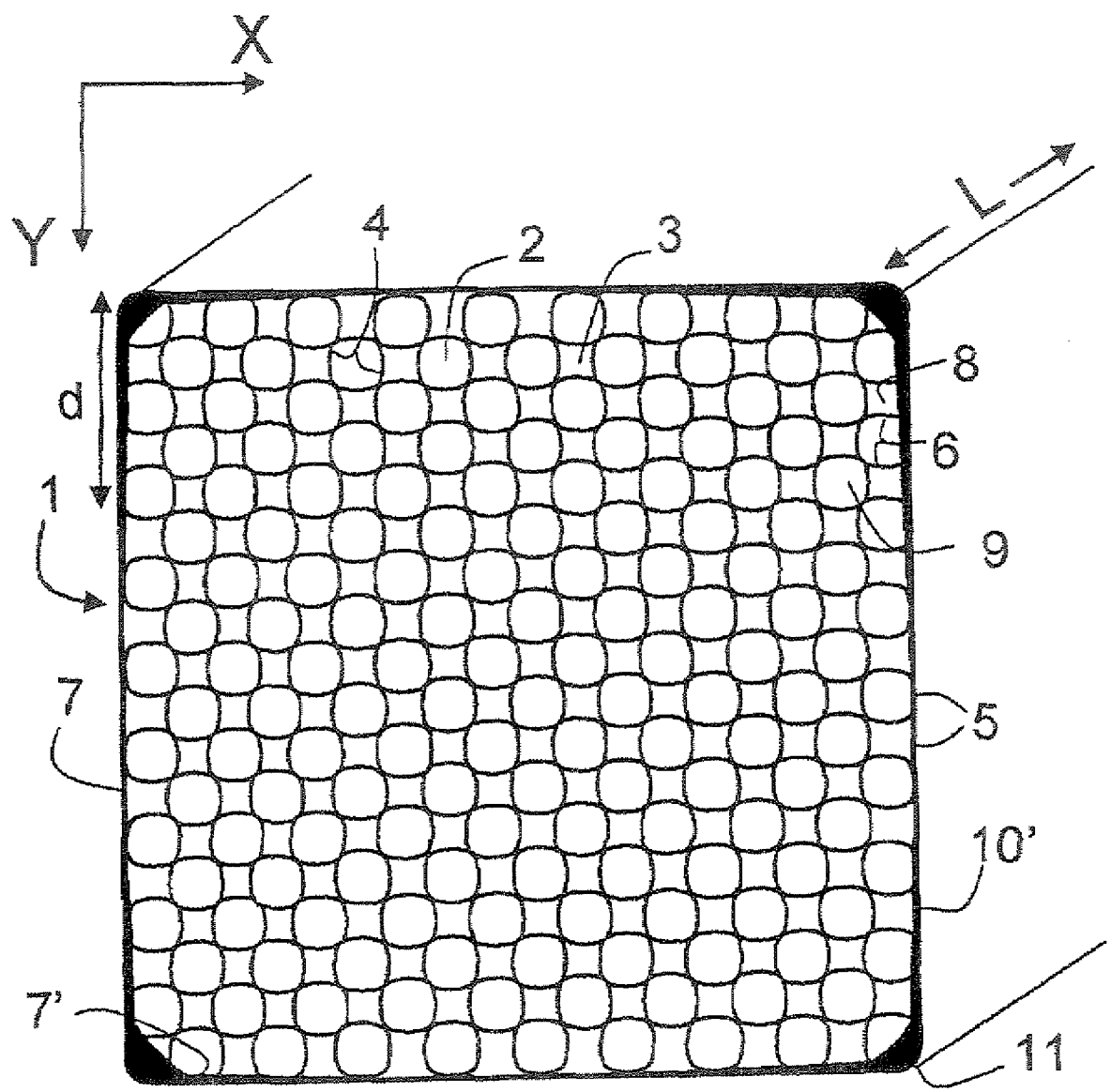
FIG. 6 illustrates a cross section of a monolithic element combining the features of the aforementioned second and third embodiments of the invention.

FIG. 6 illustrates a fourth embodiment of the invention, in which the curvature radius $R_2$ is less than the curvature radius $R_1$ and in which the increased thickness 10' extends over the sides of the element along a width d, in a decreasing and substantially regular manner from the corner and in the direction of the middle of the sides in a manner similar to the embodiment illustrated by FIG. 4.

According to the invention, the reinforcement of the corners preferably extends over the whole length L of the element, from the upstream face to the downstream face.

In the case where the corners have a rounded shape, the width d of the reinforcement is advantageously determined, according to the invention, as a function of the curvature radii $R_2$ and $R_1$. Typically, the radii $R_2$ and $R_1$ are chosen so that the width d of the reinforcement lies between 0.5 and 8 times the width of a cell, preferably between 1 and 6 times the width of a cell.

The porous material forming the individual elements is preferably made of silicon carbide recrystallized at a temperature lying between 2100 and 2400° C.

The invention and its advantages will be better understood on reading the following examples given purely as illustrations.

All the elements of the following examples have been synthesized in a conventional manner and as described in Example 1:

EXAMPLE 1 (ACCORDING TO THE PRIOR ART)

According to the techniques of the art described, for example, in patent applications EP 816 065, EP 1 142 619, EP 1 455 923 or else WO 2004/090294, a first population of monolithic honeycomb-shaped elements made of silicon carbide have been synthesized.

To do this, the following elements are mixed in a mixer:

3000 g of a mixture of silicon carbide particles more than 98% pure and having a particle size such that 70% by weight of the particles has a diameter greater than 10 micrometers, the median diameter of this particle size fraction being less than 300 micrometers. Within the meaning of the present description, the median diameter is the diameter of the particles below which 50% by weight of the population is found.

150 g of an organic binder of the type derived from cellulose.

Water is added and mixing takes place until a smooth paste is obtained whose plasticity allows extrusion, the die being configured to obtain monolithic blocks whose channels and outer walls have a wavy structure illustrated by FIG. 1 and according to the teaching of application WO 05/064132.

The raw monoliths obtained are then microwave-dried for a sufficient time to bring the content of water not chemically bound to less than 1% by weight.

The channels of each face of the monolith are then alternately stopped according to well known techniques, for example described in application WO 2004/065088.

The monolithic block is then baked at a temperature rise of 20° C./hour until a temperature of the order of 2200° C. is reached which is maintained for 2 hours.

The material obtained has an open porosity of 47% and an average pore distribution diameter of the order of 15 μm.

The structural features of the elements thus obtained are given in Table 1 below.

The inner face of the outer wall has a wavy surface such that the thickness of the outer wall varies between a minimum of 544 microns and a maximum of 767 microns. The average thickness of the outer wall is approximately 660 microns.

For the formation of the filter, the elements originating from one and the same mix are then assembled together by bonding by means of a cement with the following chemical composition: 72% by weight of SiC, 15% by weight of $Al_2O_3$, 11% by weight of $SiO_2$, the rest consisting of impurities, mainly $Fe_2O_3$ and alkaline metal oxides and alkaline earths. The average thickness of the joint between two adjacent blocks is of the order of 2 mm. The thermal conductivity of the joint cement after heat treatment is of the order of 2.1 W/m.K at ambient temperature and its measured open porosity is approximately 38%.

The assembly is then machined, in order to produce cylinder-shaped assembled filters.

EXAMPLE 2 (ACCORDING TO THE INVENTION)

The synthesis technique previously described is repeated identically, but the die this time is adapted so as to produce monolithic blocks characterized by a wavy disposition of the inner channels, outer walls whose inner face is substantially flat, and a constant and continuous increased thickness of the corners, according to the embodiment illustrated by FIG. 3. This example makes it possible to illustrate an embodiment in which $\alpha=0$ and $R_1=R_2$.

The main structural features of the elements obtained according to this example are listed in Table 1.

EXAMPLE 3 (ACCORDING TO THE INVENTION)

The synthesis technique previously described is also repeated identically, but the die this time is adapted so as to produce monolithic blocks characterized by a wavy disposition of the inner channels, outer walls whose inner face is substantially flat, and a constant and continuous increased thickness of the corners, according to the embodiment illustrated by FIG. 4. This example makes it possible to illustrate an embodiment in which $\alpha>0$ and $R_1=R_2$. The main structural features of the elements obtained according to this example are listed in Table 1.

EXAMPLE 4 (According to the Invention)

The synthesis technique previously described is also repeated identically, but the die this time is adapted so as to produce monolithic blocks characterized by a wavy disposition of the inner channels, outer walls whose inner face is substantially flat, and an increased thickness of the corners according to the embodiment illustrated by FIG. 5. This example makes it possible to illustrate an embodiment in which $\alpha=0$ and $R_1>R_2$.

The main structural features of the elements obtained according to this example are listed in Table 1.

EXAMPLE 5 (ACCORDING TO THE INVENTION)

The synthesis technique previously described is also repeated identically, but the die this time is adapted so as to produce monolithic blocks characterized by a wavy disposition of the inner channels, outer walls whose inner face is substantially flat, and a continuous and decreasing increased thickness of the corners, according to the embodiment illustrated by FIG. 6 except that $R_1<R_2$.

The main structural features of the elements obtained according to this example are listed in Table 1 below.

TABLE 1

|  | Example 1 | Example 2 | Example 3 | Example 4 | Example 5 |
|---|---|---|---|---|---|
| Representative shape | FIG. 2 | FIG. 3 | FIG. 4 | FIG. 5 | FIG. 6 but $R_1 < R_2$ |
| Geometry of the inner channels | wavy | Wavy | wavy | wavy | wavy |
| Geometry of the outer walls (inner face) | wavy | Smooth | smooth | smooth | smooth |
| Element size (mm) | 37.8 | 37.8 | 37.8 | 37.8 | 37.8 |
| Channel density (CPSI) | 270 | 270 | 270 | 270 | 270 |
| Thickness e of the inner walls (μm) | 310 | 310 | 310 | 310 | 310 |
| Thickness $E_{min}$ of the outer walls (μm) | 544 | 660 | 660 | 660 | 660 |
| Element length (cm) | 20.32 | 20.32 | 20.32 | 20.32 | 20.32 |
| External volume of the element (cm³) | 290.3 | 290.3 | 290.3 | 290.3 | 290.3 |
| Maximal thickness E' of the increased thickness (μm) outside the corner | 767 | 847 | 838 | 660 | 847 |
| Width d of the reinforcement (mm) | 0 | 5.2 | 5.2 | 2.0 | 5.2 |
| Width d' of the reinforcement outside the corner (mm) | 0 | 3.4 | 3.4 | 0 | 3.6 |
| $R_2$ (mm) | 1.0 | 1.0 | 1.0 | 1.0 | 1.0 |
| $R_1$ (mm) | NA | 1.0 | 1.0 | 1.6 | 0.8 |
| Angle α (degrees) | 0 | 0 | 3 | 0 | 3 |
| Thickness Ec of the element in the corner (μm) | 663 | 1198 | 1183 | 1182 | 1114 |
| $E_c/e$ | 2.14 | 3.86 | 3.82 | 3.81 | 3.59 |
| $E_c/E_{min}$ | 1.22 | 1.82 | 1.79 | 1.79 | 1.69 |
| E'/e | 2.47 | 2.73 | 2.70 | 2.13 | 2.73 |
| Weight (g) | 189.1 | 191.6 | 190.8 | 190.1 | 190.7 |
| Weight relative to Example 1 |  | +1% | +1% | +1% | +1% |

(NA = not applicable)

The samples of the foregoing examples were assessed by the following tests:

A—Measurement of Thermomechanical Strength:

Filters, assembled from the elements of Examples 1 to 5 according to the previously described operating mode, are mounted on an exhaust line of a 2.0 l direct injection diesel engine set to run at full power (4000 rpm) for 30 minutes and then removed and weighed in order to determine their initial weight. The filters are then reinstalled on an engine bench with a speed of 3000 rpm and a torque of 50 Nm for different periods in order to obtain a soot load of 6 g/liter (in volume of the filter).

The filters thus loaded are reinstalled onto the line to undergo a severe regeneration defined thus: after a stabilization at an engine speed of 1700 revolutions/minute at a torque of 95 Nm for 2 minutes, a post-injection is carried out with 70° of phasing for a post-injection output of 18 mm³/stroke. Once combustion of the soot is initiated, more precisely when the loss of load diminishes for at least 4 seconds, the engine speed is reduced to 1050 revolutions/minute at a torque of 40 Nm for 5 minutes in order to accelerate the combustion of the soot. The filter is then subjected to an engine speed of 4000 revolutions/minute for 30 minutes in order to eliminate the remaining soot.

The regenerated filters are inspected after being cut open to reveal any presence of cracks visible to the naked eye. The thermomechanical strength of the filter is assessed with respect to the number of cracks, a low number of cracks reflecting an acceptable thermomechanical strength for use as a particle filter.

B—Measurement of the Mechanical Strength

Breaking strength is measured at ambient temperature for each example on 30 test specimens corresponding to elements of one and the same manufacturing batch with dimensions of 20.32 cm in length and 37.8 mm in width. Mounting in 4-points flexion is carried out with a distance of 180 mm between the two bottom bearing surfaces and a distance of 90 mm between the two top punches typically according to the ASTM C1161-02.c standard. Rubber elements are placed on the punches in order to prevent initiation of compression cracks on the top face of the test specimen which might adversely affect the quality of the measurements. The speed of descent of the punch is constant, of the order of 10 mm/min. An average of the 30 measurements is considered to be representative of the mechanical strength for each example.

The main analysis and assessment data of the filters obtained according to Examples 1 to 5 are listed in Table 2 below.

TABLE 2

|  | Example 1 | Example 2 | Example 3 | Example 4 | Example 5 |
|---|---|---|---|---|---|
| Average measured porosity (%) | 47.1 | 46.9 | 47.2 | 47.3 | 47.4 |
| Measured breaking strength (N) | 3900 | 4150 | 4200 | 4450 | 4500 |
| Breaking strength/weight Calculated ratio (n/g) | 20.6 | 21.7 | 22.0 | 23.4 | 23.6 |

TABLE 2-continued

|  | Example 1 | Example 2 | Example 3 | Example 4 | Example 5 |
|---|---|---|---|---|---|
| Number of cracks observed in a filter after a 6 g/l regeneration | 5 to 10 | 0 to 5 | 0 to 4 | 0 to 5 | 0 to 5 |

It can be seen in Table 2 that the monolithic elements of Examples 2 to 5 have a higher Breaking strength to Weight ratio and the filters of these examples show a better thermomechanical behavior than for Example 1.

The results imply also that it maybe possible, according to the present invention, to provide element for the formation of a filter retaining the good thermomechanical properties of the previously described filters with reinforced wall, but whose total weight is substantially reduced.

Obviously, numerous modifications and variations of the present invention are possible in light of the above teachings. It is therefore to be understood that within the scope of the appended claims, the invention may be practiced otherwise than as specifically described herein.

The invention claimed is:

1. A monolithic honeycomb element, comprising a plurality of adjacent ducts or channels, wherein:
   each of the plurality of adjacent ducts or channels is situated along an axis, the axes of the plurality of adjacent ducts or channels being substantially parallel;
   each of the plurality of adjacent ducts or channels is separated from adjacent ducts or channels by porous walls;
   each of the plurality of adjacent ducts or channels is stopped by a plug at one end;
   the plurality of adjacent ducts or channels comprises inlet ducts or channels being open at a gas intake face of the element, and outlet ducts or channels being open at a gas discharge face of the element, such that gas passing from the gas intake face of the element to the gas discharge face of the element passes through the porous walls;
   the plurality of adjacent ducts or channels comprises peripheral ducts or channels forming part of an outer wall of the element, the peripheral ducts or channels being configured to provide the element with an outer wall having an inner face that is substantially flat over an entire length of the element;
   the outer wall, when viewed in a cross-section substantially perpendicular to the axes of the plurality of adjacent ducts or channels, comprises at least one corner portion;
   the outer wall has a first cross-sectional thickness at the corner portion, the first cross-sectional thickness being measured along a line bisecting an angle between portions of the outer wall adjacent to the corner portion;
   the outer wall has a second cross-sectional thickness, the second cross-sectional thickness being a minimum thickness of the outer wall; and
   a ratio of the first cross-sectional thickness to the second cross-sectional thickness is greater than 1.5.

2. The monolithic element according to claim 1, wherein interior walls separating the plurality of adjacent ducts or channels are provided with a periodic undulation when viewed in the cross-section, such that the inlet channels have a greater cross-sectional area than the outlet channels.

3. The monolithic element according to claim 1, wherein a portion of the outer wall having the second cross-sectional thickness is located substantially centrally between two adjacent corner portions.

4. The monolithic element according claim 1, wherein:
   the outer wall includes an area of increased thickness including the corner portion and extending along portions of the outer wall adjacent to the corner portion; and
   a cross-sectional thickness of the outer wall in the area of increased thickness is continuous and constant over an entirety of the area of increased thickness.

5. The monolithic element according to claim 1, wherein:
   the outer wall includes an area of increased thickness including the corner portion and extending along portions of the outer wall adjacent to the corner portion; and
   a cross-sectional thickness of the outer wall in the area of increased thickness decreases continuously from the corner portion to locations on portions of the outer wall adjacent to the corner portion most distant from the corner portion.

6. The monolithic element according to claim 1, wherein:
   the outer wall includes an area of increased thickness including the corner portion and extending along portions of the outer wall adjacent to the corner portion;
   the inner face of the outer wall has a surface area in the area of increased thickness and a total surface area; and
   the surface area in the area of increased thickness is at least one eighth of the total surface area.

7. The monolithic element according to claim 1, wherein:
   the outer wall includes an area of increased thickness including the corner portion and extending along portions of the outer wall adjacent to the corner portion;
   the inner face of the outer wall has a surface area in the area of increased thickness and a total surface area; and
   the surface area in the area of increased thickness is at least one quarter of the total surface area.

8. The monolithic element according claim 1, wherein:
   the outer wall has an average cross-sectional thickness; and
   a ratio of the first cross-sectional thickness to the average cross-sectional thickness is greater than 2.7.

9. The monolithic element according claim 1, wherein:
   the outer wall has an average cross-sectional thickness; and
   a ratio of the first cross-sectional thickness to the average cross-sectional thickness is greater than 3.5.

10. The monolithic element according to claim 1, wherein the first cross-sectional thickness is between 150 and 5000 microns.

11. The monolithic element according to claim 1, wherein the first cross-sectional thickness is between 700 and 2000 microns.

12. The monolithic element according to claim 1, wherein the first cross-sectional thickness is between 1000 and 1300 microns.

13. The monolithic element according to claim 1, in which the second cross-sectional thickness is between 100 and 3500 microns.

14. The monolithic element according to claim 1, in which the second cross-sectional thickness is between 450 and 1300 microns.

15. The monolithic element according to claim 1, in which the second cross-sectional thickness is between 600 and 900 microns.

16. The monolithic element according to claim 1, wherein:
   the outer wall has an average cross-sectional thickness; and
   the average cross-sectional thickness is between 100 and 400 microns.

17. The monolithic element according to claim 1, wherein:
   the outer wall has an average cross-sectional thickness; and
   the average cross-sectional thickness is between 200 and 350 microns.

18. A filter comprising a plurality of monolithic elements according to claim 1, wherein the plurality of elements are joined by a joint cement.

19. The filter according to claim 18, wherein the plurality of elements and the joint cement comprise the same ceramic material.

20. The filter according to claim 19, wherein the ceramic material comprises silicon carbide.

21. An extrusion die for extruding a ceramic material, comprising a structure configured to form the monolithic element according to claim 1 from the ceramic material.

* * * * *

UNITED STATES PATENT AND TRADEMARK OFFICE
CERTIFICATE OF CORRECTION

PATENT NO.        : 7,658,779 B2
APPLICATION NO. : 11/567330
DATED             : February 9, 2010
INVENTOR(S)       : Francisco Jose Carranza et al.

It is certified that error appears in the above-identified patent and that said Letters Patent is hereby corrected as shown below:

Column 12, line 1, "according claim 1" should read --according to claim 1--;
line 33, "according claim 1" should read --according to claim 1--;
line 37, "according claim 1" should read --according to claim 1--;
line 60, "according claim 1" should read --according to claim 1--;
line 64, "according claim 1" should read --according to claim 1--.

Signed and Sealed this

Twenty-ninth Day of June, 2010

David J. Kappos
*Director of the United States Patent and Trademark Office*